Feb. 3, 1959  P. G. WHITE  2,872,632
CONTROL SYSTEM FOR INDUCTION MOTOR
Filed July 25, 1956  2 Sheets-Sheet 2

INVENTOR.
Paul G. White,
BY
John H. Leonard &
Harold J. Rathbun
ATTORNEYS.

2,872,632

CONTROL SYSTEM FOR INDUCTION MOTOR

Paul G. White, Cleveland, Ohio, assignor to Square D Company, Detroit, Mich., a corporation of Michigan Application July 25, 1956, Serial No. 600,073

4 Claims. (Cl. 318—204)

This invention relates to control systems for alternating current induction motors which are utilized as driving motors for apparatus in which the load at times overhauls the motor and drives it, and in which the overhauling load must be retarded to prevent the overhauling speed from becoming excessive. The invention is particularly applicable to the control of motors driving hoist mechanisms in which the motors may be overhauled and driven by descending loads and the invention is hereinafter described as applied to that use.

A common type of control system for induction motor driven hoist mechanisms is known as a counter-torque system. In a counter-torque hoist control system, the speed of overhauling descending loads at times is controlled by causing the motor to exert adjustable amounts of torque in the hoisting direction. The adjustment of this hoisting or counter-torque is accomplished by moving a master switch into selected lowering or counter-torque positions. The counter-torque increases progressively as the master switch approaches an "off" position. Usually return of the master switch from the lowering positions into the "off" position causes immediate removal of power from the motor and the setting of a load-holding brake. In many applications of counter-torque controllers, it has been found that the master switch is returned so quickly from the weak counter-torque positions through the strong counter-torque positions to the "off" position that the stronger counter-torque positions are not fully utilized to slow down descending loads. Consequently, the load-holding brake must assume most of the stopping duty. This results in excessive brake wear.

The control system described herein prevents excessive wear of the load-holding brake by assuring the maintenance of the stronger counter-torque connections and the prevention of the setting of the brake for an interval after the master switch is moved to the off position from a lowering speed position no matter how fast the master switch is moved to the "off" position.

Prior attempts to maintain the counter-torque connections after the master switch reaches the "off" position have not been entirely successful because of the possibility of excessive reversal or hoisting of the load. This possibility of load reversal is greatly increased when provision is made to select counter-torque operation either by manipulation of the master switch or by operation of a push button.

In the present invention, the amount of counter-torque provided after the master switch reaches the "off" position is such as to stop any load carried by the hoist mechanism. After stopping, the load is reversed slightly. At this instant, an automatic means becomes operative to remove power from the motor and to cause setting of the load-holding brake. The automatic means is so arranged that excessive hoisting of the load due to the counter-torque connections is positively prevented even if the push button which was closed to set up the counter-torque connections is inadvertently held closed.

Objects of this invention are to provide an improved control system for an alternating current motor subject to overhauling loads; an improved counter-torque hoist control system; an improved counter-torque hoist control system in which the counter-torque connections are maintained after a master control element has been returned to an off position from a counter-torque position; a counter-torque hoist control system in which the counter-torque connections are maintained and a holding brake is held released until the motor comes to rest even with the master control element in an off position; improved means responsive to the electrical condition of a motor for removing counter-torque connections after the motor stops; and a counter-torque hoist control system in which the counter-torque connections are completed in response to movement of a master switch from a down-power position into a counter-torque position, or by operation of a push button while the master switch is in a counter-torque position, and in which, after the master switch is moved to the off position, the load is brought to rest by the proper counter-torque irrespective of the position of the counter-torque-selecting push button.

In accordance with this invention, a master control relay that is energized to set up counter-torque connections when a master switch is in certain of its lowering speed positions completes its own holding circuit that is maintained even after the master switch is returned to the "off" position. Thus the counter-torque connections are maintained after the master switch reaches the "off" position. As soon as the motor stops and starts in the hoisting direction, a relay responsive to the frequency of the secondary voltage of the motor picks up and deenergizes the master control relay. Thereupon power is removed from the motor and a holding brake is set. A push button in the handle of the master switch is also provided to effect energization of the master control relay. Should this push button inadvertently be held closed, after the motor stops and starts in the hoisting direction, the frequency relay ordinarily would not effect deenergization of the master control relay and the motor would continue to operate in the hoisting direction. To prevent this undesirable and unsafe operation, the frequency relay is arranged to deenergize an undervoltage relay upon reversal of the motor should the push button be held closed. Deenergization of the undervoltage relay causes power to be removed from the motor and the brake to be set the same as if the master control relay had been deenergized. To insure that the frequency relay does not cause deenergization of the undervoltage relay during normal hoisting operations, its contacts in the undervoltage relay circuit are paralleled by normally closed contacts of the master control relay.

Other objects and advantages of this invention will become apparent from the following description wherein reference is made to the drawings in which.

Figure 1:
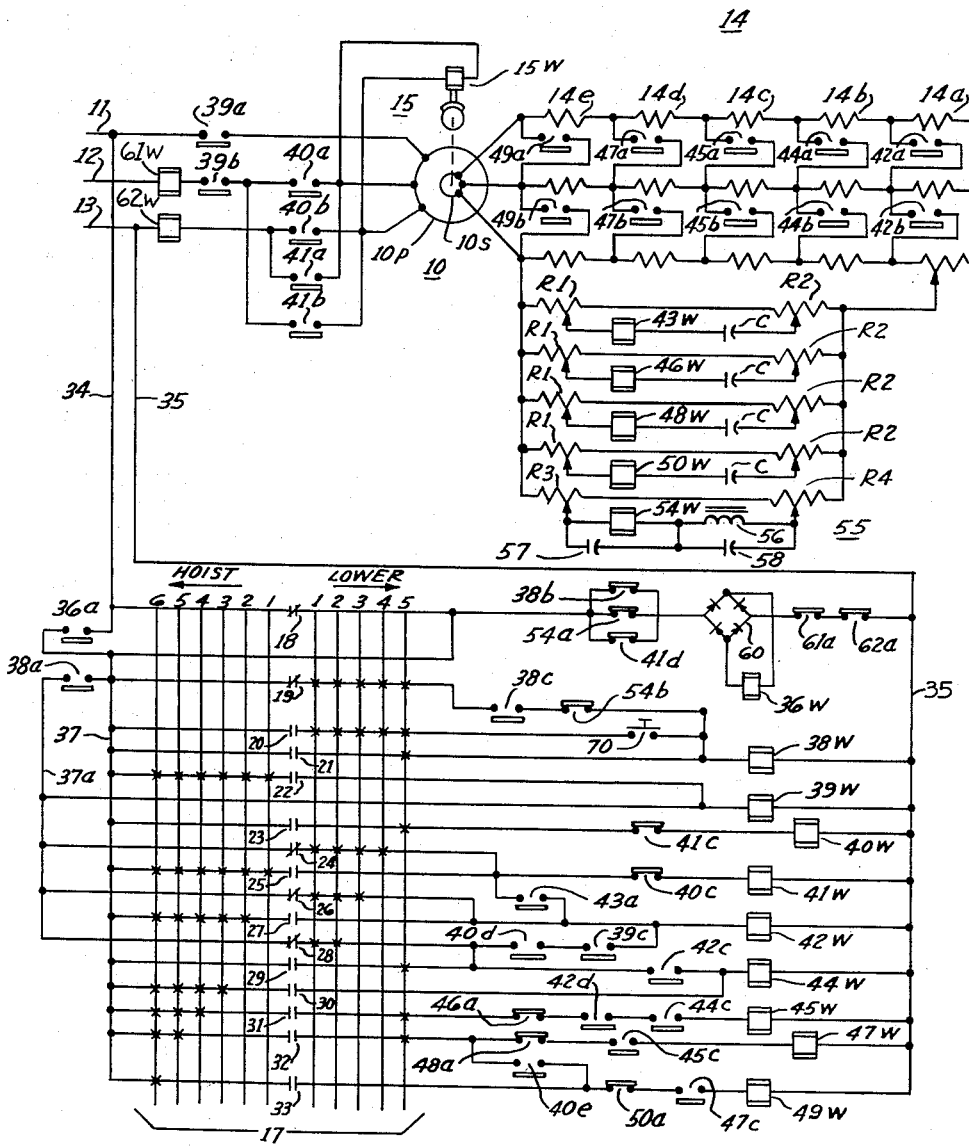
Fig. 1 is an elementary wiring diagram of a control system embodying the invention.
Figure 2:
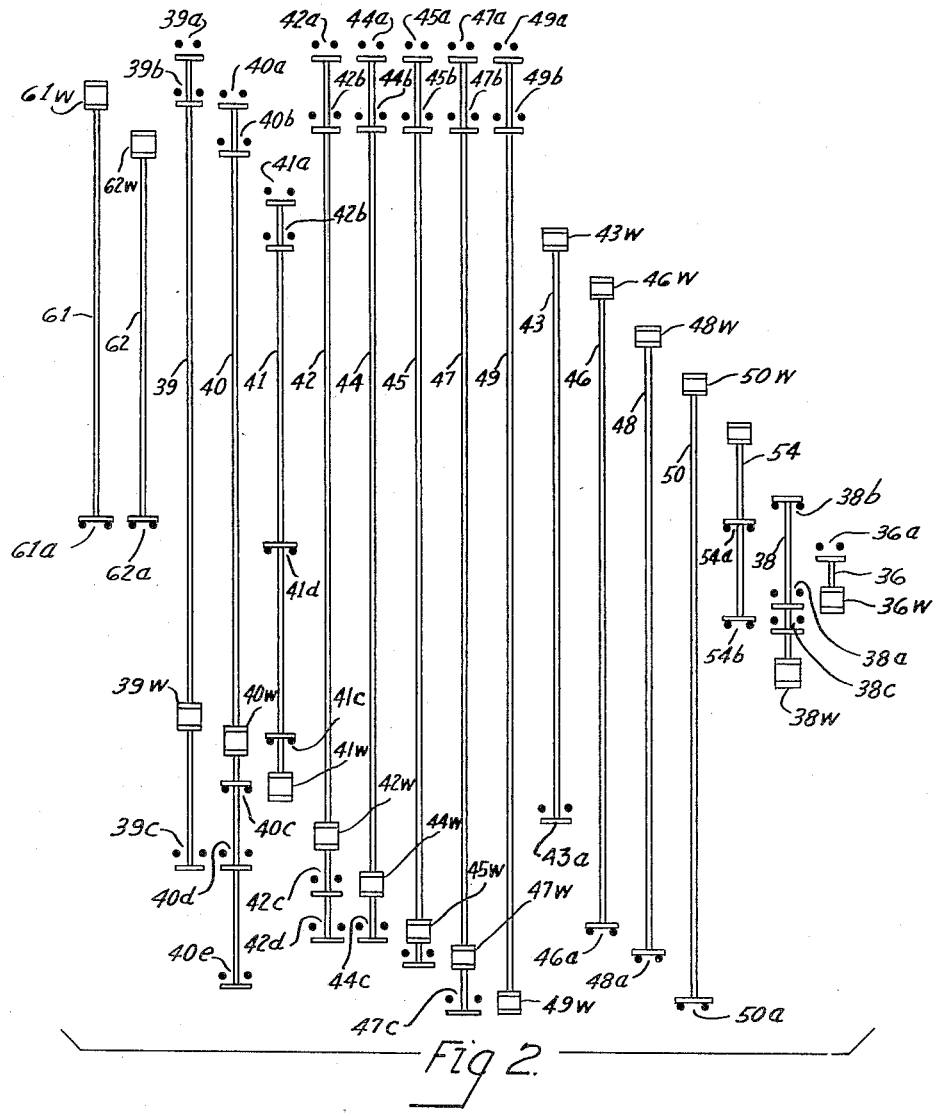
Fig. 2 is a chart showing the mechanical connection between the several operating means and the contacts of Fig. 1, corresponding coils and contacts in Figs. 1 and 2 being in horizontal alignment.

Referring to Fig. 1, a polyphase wound rotor induction motor 10 having a primary winding 10p and a secondary winding 10s is arranged to drive a load (not shown) which may at times become overhauling. The primary winding 10p is arranged to be supplied with polyphase power from a suitable source represented by supply lines 11, 12, and 13, whereas the secondary winding 10s is connected to a Y-connected resistor bank 14 having sections 14a through 14e. An electromagnetic holding brake 15 for the motor 10 has its operating coil 15w connected across two of the terminals of the primary winding 10p so as to be energized and deenergized with the motor. When the coil 15w is energized, a shoe is released from a brake drum, and when the coil 15w is deenergized the shoe is applied to the brake drum by a spring (not shown) or gravity.

The motor 10 is controlled by a multi-position, reversing master switch 17 having contacts 18 through 33, six hoisting positions, five lowering positions, and an intermediate off position. The fifth lowering position is a regenerative braking position or zone and the other lowering positions are counter-torque positions or counter-torque zones which are progressively stronger as the off position is approached. All of the contacts 18 through 33 are open in the off position except the contacts 18, 19, 24, 26 and 28 which are closed as indicated by the respective slanting lines drawn thereacross. The closed or opened condition of the contacts 18 through 33 in the hoisting and lowering positions is indicated by the presence or absence of crosses aligned with the contacts. For example, the contacts 31 are closed in the last three hoisting positions and in the last lowering position, but are open in all other positions.

The contacts 18 through 33 control the energization of the operating coils of various contactors and relays. Power for the operating coils of the various contactors and relays is obtained from the supply lines 11 and 13 through conductors 34 and 35. Each of the contactors has a pair of normally open main contacts identified by the reference numeral of the contactor followed by the letters $a$ and $b$, and auxiliary contacts followed by the letters $c$, $d$, or $e$ depending upon the number of auxiliary contacts.

A coil 36w of an undervoltage relay 36 is energized through the contacts 18 when the master switch 17 is in its off position, and is maintained energized in other positions of the master switch through normally open contacts 36a of the relay 36 which when closed also connect a conductor 37 to the conductor 34. The conductor 37 serves as the supply conductor for the master switch contacts 19 through 33. The contacts 24, 26, and 28 are supplied from the conductor 37 through a conductor 37a which is connected to the conductor 37 through normally open contacts 38a of a master control relay 38 having a coil 38w.

A coil 39w of a main contactor 39 is energized through the contacts 22 in all hoisting positions, and, provided the contacts 38a are closed, through the contacts 38a in all lowering positions and in the off position.

A coil 40w of a lowering contactor 40 is energized through the contacts 23 in the fifth lowering position provided normally closed auxiliary contacts 41c of a hoisting contactor 41 are closed. A coil 41w of the hoisting contactor 41 is energized in all hoisting positions through the contacts 25 provided normally closed auxiliary contacts 40c of the lowering contactor 40 are closed, and in the off position and the first four lowering positions through the contacts 24 provided the contacts 38a and 40c are closed. Preferably, the contactors 40 and 41 are mechanically interlocked in any suitable manner as well as electrically interlocked by the normally closed auxiliary contacts 40c and 41c.

A coil 42w of a first acceleration contactor 42 is energized through the contacts 27 in all hoisting positions except the first, and, provided the contacts 38a are closed, in the off position and the first three lowering positions through the contacts 26. The coil 42w also becomes energized in the first four lowering positions through the contacts 38a and 24 provided contacts 43a of an overspeed relay 43 are closed, and in the last lowering speed position through the contacts 29 provided normally open auxiliary contacts 40d and 39c are closed.

A coil 44w of a second acceleration contactor 44 becomes energized in the last four hoisting positions through the contacts 30, in the last lowering position through the contacts 29 provided normally open auxiliary contacts 42c are closed, and in the off and first two lowering positions through the contacts 28 provided the contacts 38a and 42c are closed.

A coil 45w of a third acceleration contactor 45 is energized in the last three hoisting positions and in the last lowering position through the contacts 31 provided normally open auxiliary contacts 42d and 44c are closed and normally closed auxiliary contacts 46a of a first acceleration relay 46 are closed.

A coil 47w of a fourth acceleration contactor 47 is energized in the last two hoisting positions and in the last lowering position through the contacts 32 provided normally open auxiliary contacts 45c are closed and normally closed contacts 48a of a second acceleration relay 48 are closed.

A coil 49w of a fifth acceleration contactor 49 is energized in the last hoisting position through the contacts 33 provided normally open auxiliary contacts 47c and normally closed contacts 50a of a third acceleration relay 50 are closed. The coil 49w is also energized in the last lowering speed position through the contacts 32 provided normally open auxiliary contacts 40e are closed and the contacts 47c and 50a are closed.

Contacts 39a, 39b, 40a and 40b when closed connect the primary winding 10p to the supply lines 11, 12, and 13 for causing the motor 10 to exert torque in the hoisting direction, and the contacts 39a, 39b, 41a, and 41b when closed connect the primary winding 10p to the supply lines 11, 12, and 13 for causing the motor 10 to exert torque in the lowering direction. Since the coil 15w of the brake 15 is connected across the two terminals of the primary winding 10p to which the contacts 40a, 40b, 41a, and 41b are connected, the brake 15 is released whenever the motor 10 is energized and is set whenever the motor is deenergized. Contacts 42a and 42b when closed short circuit the resistor sections 14a, contacts 44a and 44b when closed short circuit the resistor sections 14a and 14b, contacts 45a and 45b when closed short circuit the resistor sections 14a through 14c, contacts 47a and 47b when closed short circuit the resistor sections 14a through 14d, and contacts 49a and 49b when closed short circuit all of the resistor 14.

The relays 43, 46, 48, and 50 have their respective operating coils 43w, 46w, 48w, and 50w connected in respective series resonant circuits each including a capacitor C and a pair of potentiometer resistors R1 and R2. The resistors R1 and R2 of each pair are connected in series with each other across an adjustable portion of one leg of the secondary resistor 14, and the coils 43w, 46w, 48w, and 50w are connected in series with their respective capacitors C between adjustable taps on their respective pairs of resistors R1 and R2. Relays of this type are fully described in Leitch Patent No. 2,165,491, and their operation in a hoist control system is described in McArthur and Myles Patent No. 2,325,413. It will be sufficient here to point out that, upon application of power to the primary winding 10p with the motor 10 at standstill, the relays 46, 48 and 50 pick up and open their respective normally closed contacts 46a, 48a, and 50a. As the motor 10 accelerates in the direction of its torque, the relays 46, 48, and 50 drop out in sequence due to impairment of resonance of their respective resonance of their respective resonant circuits as the frequency of the secondary voltage decreases. Operation of the overspeed relay 43 is similar to that of the relays 46, 48, and 50, but its resonant circuit is designed to become resonant at about twice the frequency of the source so that the relay 43 picks up and closes its contacts 43a only at near synchronous speed in the lowering direction when the motor 10 is operating with counter-torque connections established.

Figure 3:
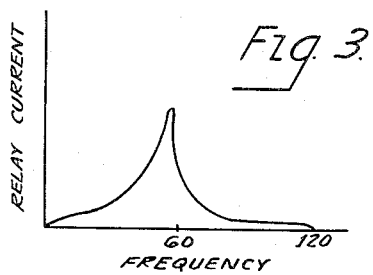
Fig. 3 is the operating characteristic of a preferred non-hoisting relay.

A non-hoisting relay 54 has its operating coil 54w connected in a resonant circuit 55 which is connected between adjustable taps on a pair of series connected resistors R3 and R4 supplied from the same adjustable portion of the secondary resistor 14 as the resistor pairs R1 and R2. The circuit 55 in addition to the winding 54w includes a reactor 56 in series with the coil 54w and capacitors 57 and 58 in parallel with the coil 54w and the reactor 56, respectively. The constants of the circuit 55 are such that the voltage across the coil 54w is greatly below the pick up value of the relay 54 at all secondary frequencies except a narrow band of frequencies in the region of the source frequency. Preferably, for a sixty cycle per second source, the current in the relay coil 54w rises sharply at about fifty-nine cycles per second under a condition of decreasing frequency as indicated in Fig. 3 wherein the current in the coil 54w is plotted against the secondary frequency for a sixty cycle motor. A curve like that of Fig. 3 is obtained when the coil 56 has an inductance of about 1.0 henry and the coil 54w has an inductance of 1.2 henries at low volts per cycle which drops because of saturation to about 0.85 henry at higher volts per cycle near the pick-up value, and the capacitors 57 and 58 have capacities of 20 and 2 microfarads, respectively. Other suitable relay means responsive to the secondary circuit of the motor 10 may be used instead of the relay 54 and its resonant circuit 55. For example, a resonant relay such as described in Myles Patent No. 2,232,257 can be used. If a relay means having a less steep characteristic than the one shown is used, secondary voltage transients that occur before closure of the hoisting contacts can cause false operation. In such case a normally open auxiliary contact on the hoisting contactor can be used to maintain the relay circuit 55 isolated until the hoisting contactor is fully closed.

For a purpose to be described, the undervoltage relay 36 is a direct current relay having its operating winding 36w connected across the output of a full-wave rectifier 60. In series with the input of the rectifier 60 are normally closed contacts 61a and 62a of overload relays 61 and 62 having their operating coils 61w and 62w in the supply lines 12 and 13, respectively. Also in series with the input of the rectifier 60 is a group of normally closed contacts 38b, 54a and 41d all in parallel with each other. A manual control element such as a push button 70 is provided for setting up counter-torque connections as will be described in detail.

Hoisting operation of the control system are conventional and will be described here only briefly. With the master switch 17 in the off position and power available at the conductors 11, 12, and 13, the rectifier 60 and the coil 36w are energized through the contacts 18, the contacts 38b, 54a, and 41d in parallel, and the contacts 61a and 62a. The contacts 36a of the relay 36 are thus closed to connect the conductor 37 to the conductor 34 and to maintain the relay 36 energized upon opening of the contacts 18. Upon movement of the master switch 17 into the first hoisting position, the coils 39w and 41w are energized through contacts 22 and 25, respectively, to close the contacts 39a and 39b and 41a and 41b. This connects the motor 10 to the supply conductors 11, 12, and 13 in a manner to cause the motor 10 to exert torque in the hoisting direction. The relays 46, 48, and 50 immediately operate to open their respective contacts 46a, 48a, and 50a. All of the resistor 14 is effective in the secondary circuit.

When the master switch 17 reaches the second hoisting position, the coil 42w is energized through the contacts 27 to close its contacts 42a and 42b thereby short circuiting the resistor section 14a. Upon movement of the master switch 17 into the subsequent hoisting positions, the coils 44w, 45w, 47w, and 49w are energized in sequence through the contacts 30, 31, 32, and 33, respectively. The coil 45w cannot become energized until the contacts 46a, 42d, and 44c close, the coil 47w cannot become energized until the contacts 48a and 45c close, and the coil 49w cannot become energized until the contacts 50a and 47c close. Energization of the coil 44w causes closure of the contacts 44a and 44b, energization of the coil 45 causes closure of the contacts 45a and 45b, energization of the coil 47w causes closure of the contacts 47a and 47b, and energization of the coil 49 causes closure of the contacts 49a and 49b. The resistor sections 14b through 14e are thus successively short circuited, the short circuiting of the sections 14c, 14d, and 14e being made speed responsive by operation of the relays 46, 48, and 50.

Should the motor 10 be heavily loaded and should the master switch 17 be left in the first hoisting position, the load might cause the motor to operate in the lowering direction. If it does, the relay 43 picks up at about synchronous speed to complete a circuit through its contacts 43a and the contacts 25 for the coil 42w. This causes closure of the contacts 42a and 42b which short circuit the resistor section 14a. The hoisting torque then is increased sufficiently to raise the load.

As to lowering operations, operation with the push button 70 open will be described first. Upon movement of the master switch 17 from the off position into the lowering positions, no coils become energized until the fifth position is reached. As soon as the fifth position is reached, the coils 38w and 40w become energized through the contacts 21 and 23, respectively. This closes the contacts 40a, 40b, 38a, and 38c and opens the contacts 38b. Opening of the contacts 38b is of no effect at this time since the contacts 54a and 41d are closed. Closure of the contacts 38c completes a holding circuit for the coil 38w through the contacts 19 and 54b, and closure of the contacts 38a energizes the conductor 37a. As soon as the contacts 38a close, the coil 39w is energized and the contacts 39a and 39b close. The primary winding 10p is now connected to the supply lines 11, 12, and 13 in a manner to cause the motor 10 to exert torque in the lowering direction. The brake 15 is released since its coil 15w is connected across the conductors 12 and 13 through the contacts 39b, 40a, and 40b. The contactors 42, 44, 45, 47, and 49 thereafter close in rapid sequence to exclude all of the secondary resistor 14. The circuit for the coil 42w is through the contacts 29, 40d, and 39c; the circuit for the coil 44w is through the contacts 29 and 42c; the circuit for the coil 45w is through the contacts 31, 46a, 42d, and 44c; the circuit for the coil 47w is through the contacts 32, 48a, and 45c; and the circuit for the coil 94w is through the contacts 32, 48e, 50a, and 47c. The motor 10 thus quickly accelerates and operates slightly below its synchronous speed if the load is not overhauling and, as a result of regenerative braking action, slightly above that speed if the load is overhauling.

Upon movement of the master switch 17 from the fifth lowering position into the fourth lowering position, the coil 40w of the lowering contactor 40 is deenergized by opening of the contacts 23 and the coil 41w of the hoisting contactor becomes energized through the contacts 24 and 40c. Preferably there is an overlap between the contacts 23 and 24 so that the contacts 24 close before the contacts 23 open in moving from the fifth to the fourth position and so that the contacts 23 close before the contacts 24 open in moving from the fourth to the fifth position. This measures rapid transition between hoisting and lowering connections at the motor, the contactors 40 and 41 operating in sequence as fast as the electrical interlock through the contacts 40c and 41c and the mechanical interlock between the contactors 40 and 41 will permit. Opening of the contacts 21 does not deenergize the coil 38w since this coil continues to be supplied through the contacts 19, 38c, and 54b. The opening of the contacts 40a and 40b and closure of the contacts 41a and 42b reverses the connections to the primary winding 10p and causes the motor to exert hoisting torque. As soon as the master switch leaves the fifth lowering position, the contacts 29, 31, and 32 open causing all of the acceleration contactors 42, 44, 45, 47, and 49 to open thereby to insert all of the resistor 14 into the secondary circuit. The motor 10 now exerts a relatively weak counter-torque and overhauling loads lower rapidly.

If a heavy overhauling load is being handled, there is a chance that the lowering speed would become excessive with the master switch 17 in the fourth lowering position. An excessive speed is prevented as described for operations with the master switch 17 in the first hoisting position by operation of the relay 43 which causes closure of the contactor 42.

Upon movement of the master switch 17 from the fourth into the third lowering speed position, the coil 42w is energized through the contacts 26. The contacts 42a and 42b thereupon close to short circuit the resistor section 14a increasing the counter-torque and causing overhauling loads to lower more slowly.

Upon movement of the master switch 17 from the third into the second lowering speed position, the coil 44w is energized through the contacts 28 and 42c. The resulting closure of the contacts 44a and 44b causes a further increase in the counter-torque and a still further reduction in speed. Preferably the counter-torque is now so strong that even an overload on the hoist mechanism is quickly brought to rest and then starts to be hoisted. As soon as the motor 10 reverses, however, the relay 54 operates to open its contacts 54b thereby deenergizing the coil 38w. When the coil 38w is deenergized, the contacts 38a open the energizing circuits for the coils 39w, 41w, 42w, and 44w. Power is thus removed from the motor 10 and the brake 15 sets to hold the load.

The contacts 19, 24, 26, and 28 are all closed in the second lowering position and remain closed upon movement of the master switch from the second lowering position through the first lowering position into the off position. Consequently, the same operation of the motor 10 occurs when the master switch is moved into any of these positions. Thus it is seen that if the master switch 17 is moved rapidly from the third, fourth, or fifth lowering position to the off position the counter-torque connections are maintained and the brake 15 remains released until the motor stops and reverses slightly, at which instant power is removed from the motor 10 and the brake 15 sets. Because the counter-torque of the motor 10 brings the motor 10 to rest before the brake 15 sets, the wear on the brake is minimized.

If it is desired to obtain the counter-torque connections without moving the master switch 17 into the fifth lowering position, the push button 70 can be closed momentarily with the master switch 17 in any of the first four lowering speed positions. Closure of the push button 70 completes a circuit through the contacts 20 to the coil 38w and causes operation of the relay 38 the same as though the master switch had been moved into the last lowering position. Thus selected values of counter-torque can be obtained by properly positioning the master switch 17 and then closing the push button 70. After the relay 38 operates, opening of the push button 70 has no operative effect.

Although operation that occurs upon moving the master switch from the fifth lowering position to the off position has been described in detail, it is obvious that the master switch can be moved back and forth through these positions as the load is lowering thereby to increase or decrease the speed at will.

In accordance with this invention, means are also provided to prevent operation of the motor 10 in the hoisting direction in event the push button 70 is inadvertently held closed while operating with the counter-torque connections established and with the master switch 17 in one of the lowering positions. This means includes the contacts 38b and 54a in the energizing circuit for the coil 36w of the undervoltage relay 36. Since the contacts 41d are open during counter-torque operation, it will be noted that the circuit to the coil 36w is maintained through only the contacts 54a while the relay 38 is energized. It will also be noted that opening of the contacts 54b when the push button 70 is closed does not cause deenergization of the relay 38. Upon operation of the relay 54 with the push button 70 held closed, the contacts 54a open to deenergize the coil 36w of the relay 36. Deenergization of the coil 36w opens the contacts 36a removing power from the conductors 37 and 37a and causing the contactors 41 and 39 to open. Thus power is removed from the motor 10 as soon as the motor starts in the hoisting direction whether the push button 70 is closed or open. If the master switch 17 is in the off position and the push button 70 is held closed, operation of the relay 36 is of no effect, but then the bypass circuit around the contacts 54b is not completed because the contacts 20 are open.

A short time delay should be imparted to the opening operation of the relay 36 to prevent a false operation when the relay 54 operates to open its contacts 54a and 54b with the push button 70 open. If drop out of the relay 38 is to follow opening of the contacts 54b as will occur so long as the push button 70 is open, it is desirable that the relay 36 not operate. Since the contacts 54b must be open to cause closure of the contacts 38b, there is a short interval when the contacts 38b, 54a, and 41d are all open. To prevent opening of the relay 36 during this period, the relay 36 is arranged to be operated with direct current obtained from the rectifier 60. Upon opening of the A.-C. supply to the rectifier 60, current continues to flow in the winding 36w for a time interval thus to delay operation of the relay 36 until the contacts 38b can close.

While a certain preferred embodiment of the invention has been specifically disclosed, it is understood that the invention is not limited thereto, as many variations will be readily apparent to those skilled in the art and the invention is to be given its broadest possible interpretation within the terms of the following claims:

I claim:

1. A hoist control system and electric motor combination comprising a polyphase wound rotor induction motor, a brake for said motor, control means movable from an off position into a hoisting position and a lowering position selectively, said lowering position including a counter-torque position adjacent said off position and a regenerative braking position adjacent said counter-torque position on the side remote from said off position, regenerative braking switching means operative upon movement of said control means to said regenerative braking position to connect said motor to a source of power for regenerative braking operation and to release said brake, counter-torque switching means operative upon movement of said control means into said counter-torque position from said regenerative braking position to connect said motor to said source for counter-torque operation and to maintain said brake released, means operative in conjunction with said control means upon movement of said control means into said off position from said counter-torque position to maintain said motor connected for counter-torque operation and said brake released, disconnecting means operative for disconnecting the motor from said source and setting said brake, speed responsive means responsive to the speed of said motor after the control means reaches the off position from a counter-torque position for rendering said disconnecting means so operative when the speed of said motor is in the neighborhood of zero to enable the counter-torque to substantially stop the load, and said counter-torque switching means including means operative to insure disconnection of said motor from said source independently of the operation of said speed responsive means upon movement of said control means from said counter-torque position through said off position into said hoisting position.

2. A hoist control system and electric motor combination comprising a polyphase wound rotor induction motor, a brake for said motor, a master switch movable from an off position into a hoisting position and a lowering position selectively, said lowering position including a counter-torque position adjacent said off position and a regenerative braking position adjacent said counter-torque position on the side remote from said off position, regenerative braking switching means operative upon movement of said master switch in said regenerative braking position to connect said motor to a source of power for regenerative braking operation and to release said brake, counter-torque switching means operative upon movement of said control means into said counter-torque position from said regenerative braking position to connect said motor to said source for a counter-torque operation and to maintain said brake released, a manual control means, in addition to said master switch, operable while said master switch is in said counter-torque position to render said counter-torque switching means operative to release said brake and to connect said motor to said source for counter-torque operation, means operative in conjunction with said master switch upon movement of said master switch into said off position from said counter-torque position to maintain said motor connected for counter-torque operation and said brake released, disconnecting means operative for disconnecting the motor from said source and setting said brake, and said disconnecting means being so operative a sufficiently long time after the master switch reaches the off position from said counter-torque position to enable the counter-torque to substantially stop the load.

3. The combinational according to claim 2 characterized in that said disconnecting means is operative to disconnect the motor from said source and to set said brake regardless of the operated condition of said manual control element.

4. The combination according to claim 3 characterized in that an under voltage relay is provided which is operative, upon a failure of voltage of said source, to render said counter-torque switching means inoperative and to set said brake, and, when said manual means is in a position causing operation of said counter-torque switching means, is also operative in response to operation of said disconnecting means to render said counter-top switching means inoperative and to set said brake.

References Cited in the file of this patent

UNITED STATES PATENTS

| | | |
|---|---|---|
| 2,165,491 | Leitch | July 11, 1939 |
| 2,165,521 | Taylor | July 11, 1939 |
| 2,457,724 | Randall | Dec. 28, 1948 |
| 2,581,315 | Widdows | Jan. 1, 1952 |

UNITED STATES PATENT OFFICE

CERTIFICATE OF CORRECTION

Patent No. 2,872,632                                    February 3, 1959

Paul G. White

It is hereby certified that error appears in the printed specification of the above numbered patent requiring correction and that the said Letters Patent should read as corrected below.

Column 6, line 47, for "the coil 94w" read -- the coil 49w --; line 63, for "measures" read -- insures --; column 10, lines 18 and 19, for "counter-top" read -- counter-torque --.

Signed and sealed this 2nd day of June 1959.

(SEAL)
Attest:

KARL H. AXLINE
Attesting Officer

ROBERT C. WATSON
Commissioner of Patents